United States Patent
Tang

(10) Patent No.: US 7,593,238 B2
(45) Date of Patent: Sep. 22, 2009

(54) EXPANSION CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/134,227

(22) Filed: Jun. 6, 2008

(65) Prior Publication Data

US 2009/0168371 A1 Jul. 2, 2009

(30) Foreign Application Priority Data

Dec. 27, 2007 (CN) .......................... 200710203445

(51) Int. Cl.
*H05K 7/12* (2006.01)
(52) U.S. Cl. ...................... 361/801; 361/726; 361/732; 361/759; 361/747; 312/223.2
(58) Field of Classification Search ................. 361/726, 361/747, 759, 801, 732; 312/223.1, 223.2
See application file for complete search history.

(56) References Cited

U.S. PATENT DOCUMENTS

| 5,601,349 | A | * | 2/1997 | Holt | 312/265.6 |
| 6,173,843 | B1 | * | 1/2001 | Christensen et al. | 211/41.17 |
| 6,430,056 | B1 | * | 8/2002 | Chen | 361/759 |
| 6,487,089 | B1 | * | 11/2002 | Otis | 361/796 |
| 7,002,811 | B2 | * | 2/2006 | Jing et al. | 361/801 |
| 7,057,902 | B2 | * | 6/2006 | Li | 361/801 |
| 7,283,376 | B2 | * | 10/2007 | Han et al. | 361/801 |

* cited by examiner

*Primary Examiner*—Dameon E Levi
(74) *Attorney, Agent, or Firm*—Zhigang Ma

(57) ABSTRACT

An exemplary retention assembly (30) is used to assemble expansion cards (20) or covers (22b) to an enclosure (24). The retention assembly includes a frame (36) for being fixed to the enclosure and at least one latching holder (31). Each of the at least one resisting portion of the frame is arranged to one of the at least one guiding rail respectively. The frame includes at least one guiding rail (364) and at least one resisting portion (369) disposed corresponding to the at least one guiding rail. The at least one latching holder includes a holding piece (322) for holding the cover and a resisting portion (348) configured for engaging with the resisting portion of the frame. Part of the at least one latching holder is deformable to make the resisting portions of the latching holder and the frame disengaging from each other.

16 Claims, 5 Drawing Sheets

EXPANSION CARD RETENTION ASSEMBLY

BACKGROUND OF THE INVENTION

1. Field of the Invention

The present invention generally relates to retention assemblies, particularly to an expansion card retention assembly for securing expansion cards to an electronic device enclosure.

2. Discussion of the Related Art

Referring to FIG. 5, this shows a typical retention assembly used for securing expansion cards 10 (for briefness, only one expansion card 10 is shown in FIG. 5) to an electronic device enclosure 13. The retention assembly includes a catching plate 11, a plurality of bolts 12, and a plurality of covers 14. The electronic device enclosure 13 forms an expansion card platform 130 for mounting the expansion cards 10. The expansion card platform 130 defines a plurality of vertical expansion slots (not visible). A bulge 132 is formed at a bottom of each expansion slot. The covers 14 are configured for covering the expansion slots. Each of the covers 14 is an elongated piece having a bent top end, and a narrowed bottom end (not labeled) engaging in the corresponding bulge 132. When one or more expansion cards 10 are fixed to the electronic device enclosure 13, the catching plate 11 is positioned on the bent top ends of the covers 14. The catching plate 11 is then fixed on the electronic device enclosure 13 by the bolts 12 being engaged in screw holes defined in the expansion card platform 130, thereby fastening the covers 14 to the electronic device enclosure 13. Each expansion card 10 has a mounting portion 102 having a same structure as the cover 14. Thereby, with the same manners, the expansion cards 10 maybe fastened to the electronic device enclosure 13.

In the above retention assembly, the covers 14 and the expansion cards 10 are secured to the electronic device enclosure 13 by using the bolts 12. However, installing or removing the bolts 12 is unduly time-consuming and laborious. This decreases the efficiency of installation and removal of expansion cards. In addition, a tool for installing or removing the bolts 12 is usually needed. These problems are multiplied in mass production facilities. Furthermore, after a period of time, the bolts 12 may become displaced and no longer be reliably engaged in the screw holes.

Therefore, a retention assembly which overcomes the above-described shortcomings is desired.

SUMMARY

An exemplary retention assembly is used to receive an expansion card mounted to an cover to an enclosure. The retention assembly includes a frame for being fixed to the enclosure and at least one latching holder. The frame includes at least one guiding rail and at least one resisting portion disposed corresponding to the at least one guiding rail. Each of the at least one resisting portion is arranged to one of the at least one guiding rail respectively. The at least one latching holder includes a holding piece for holding the cover and a resisting portion configured for engaging with the resisting portion of the frame. Part of the at least one latching holder is deformable to disengage the resisting portions of the latching holder and the frame from each other.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the retention assembly. Moreover, in the drawings, like reference numerals designate corresponding parts throughout the several views.

DETAILED DESCRIPTION OF THE EMBODIMENTS

Figure 1:
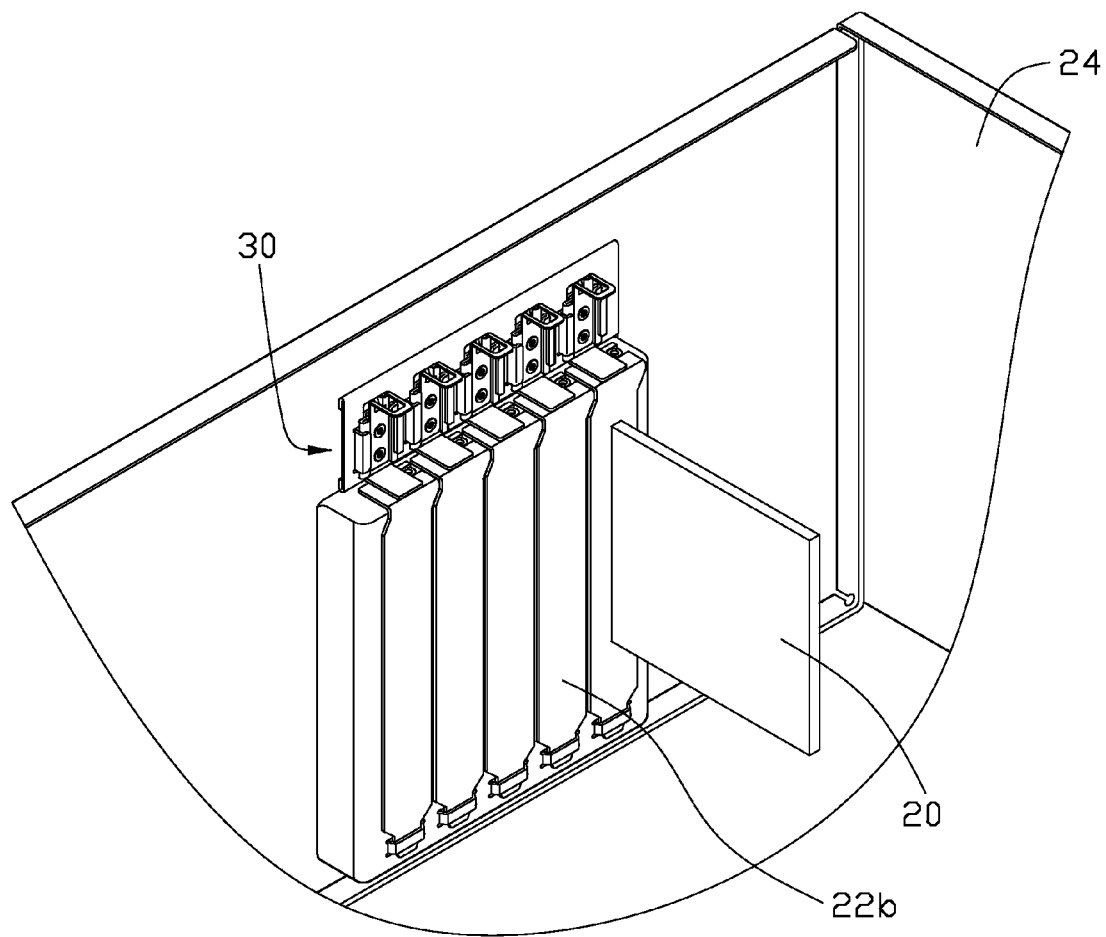
FIG. 1 is an isometric view of part of an enclosure, the enclosure having an expansion card retention assembly in accordance with a preferred embodiment of the present invention, and showing the retention assembly fully closed off with a plurality of covers thereof.
Figure 2:
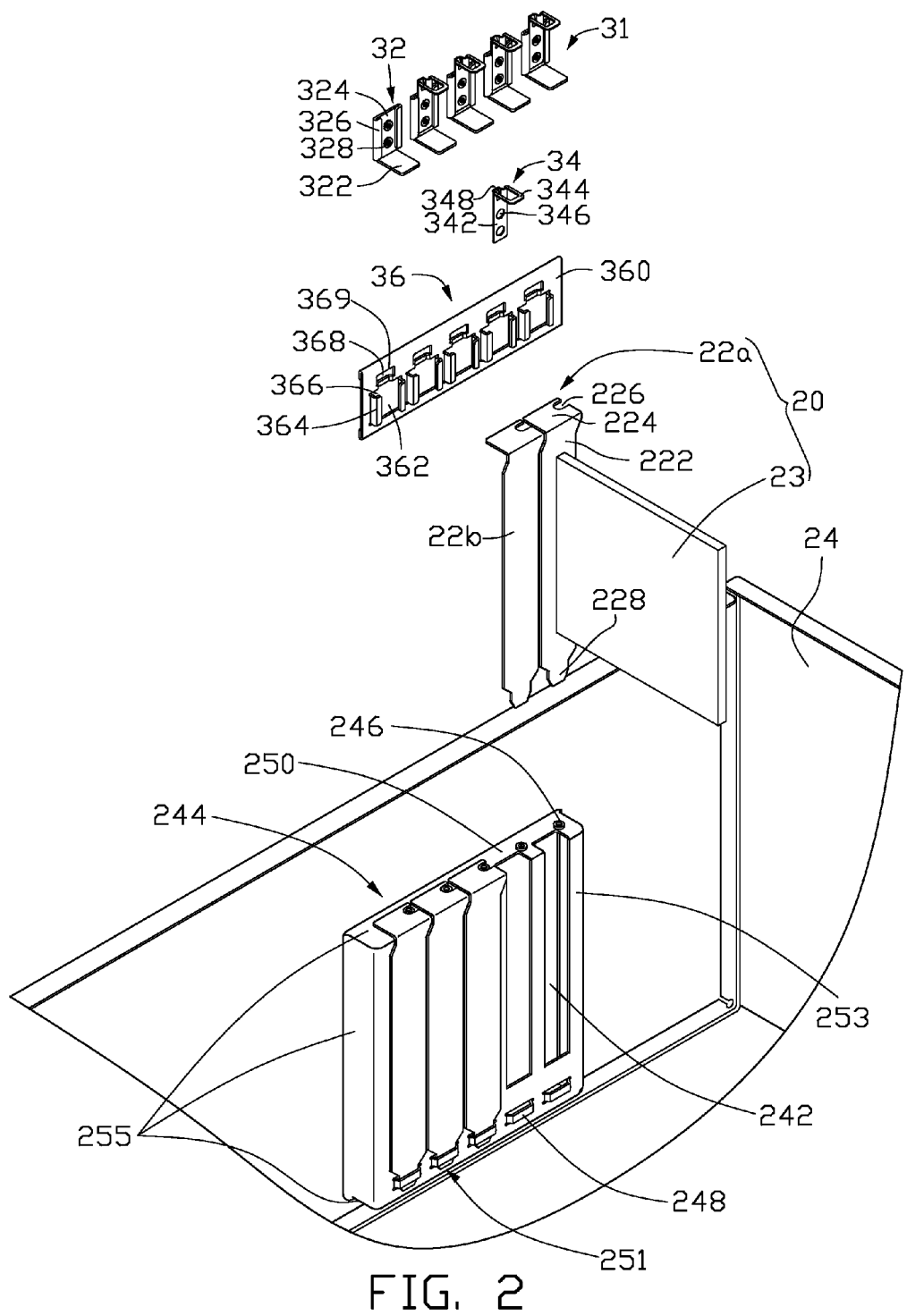
FIG. 2 is an exploded view of the retention assembly of the enclosure of FIG. 1.

Referring to the drawings in detail, FIG. 1 shows a retention assembly 30 of a preferred embodiment of the present invention. Referring also to FIG. 2, the retention assembly 30 is configured to fasten expansion cards 20 (for briefness, only one expansion card 20 is shown in FIGS. 1 and 2) to an enclosure 24. The retention assembly 30 is also configured to fasten covers 22b, each cover 22b covering a corresponding slot 242 not occupied by an expansion card.

For exemplary purposes, only one expansion card 20 will be detailed to clearly describe the preferred embodiment. The expansion card 20 includes a mounting portion 22a and a card portion 23. The mounting portion 22a includes an elongated main portion 222 and a fastening portion 224 extending substantially perpendicularly from one end of the elongated main portion 222. An edge of the fastening portion 224 defines a notch 226. The mounting portion 22a further includes a tab 228 extending from the other end of the elongated main portion 222 opposite to the fastening portion 224. A width of the tab 228 is smaller than that of the main portion 222. The card portion 23 is substantially perpendicularly to the main portion 222.

Each cover 22b has a structure substantially same as the mounting portion 22a of the expansion card 20. Thus, for briefness, the cover 22b is not detailed described.

The enclosure 24 includes an expansion card platform (rack) 244. The platform 244 has a seating surface 253, and peripheral walls 255 extending from the seating surface 253. In the illustrated embodiment, the seating surface 253 is substantially rectangular or square. One peripheral wall 255 defines a first surface 250, and an opposite peripheral wall 255 defines a second surface 251. The seating surface 253 defines a plurality of expansion card slots 242, being elongated and substantially parallel to each other. For exemplary purposes, only one expansion card slot 242 will be detailed to clearly describe the preferred embodiment. The expansion card slot 242 extending from the first surface 250 towards but not reaching the second surface 251. The platform 244 further forms a plurality of positioning members 246 on the first surface 250, corresponding to a top of the expansion card slots 242; correspondingly, and a plurality of hooking members 248 on the seating surface 253 adjacent to the second surface 251, corresponding to a bottom of the expansion card slots 242. Each of the positioning members 246 is configured to be receivable in the notch 226 of the mounting portion 22a of the expansion card 20 or the corresponding portion of the cover 22b, and each of the hooking members 248 is configured to engagingly receive the tab 228 of the mounting portion 22a of the expansion card 20 or the corresponding portion of cover 22b.

The retention assembly 30 includes a plurality of movable holders 32, a plurality of latching clips 34, and a frame 36. The number of movable holders 32 and the number of latching clips 34 each correspond to the number of the expansion card slots 242. That is, one movable holder 32 and one latching clip 34 cooperatively hold one expansion card 20 or one cover 22b. In this embodiment, there are five movable holders 32 and five latching clips 34.

For exemplary purposes, only one movable holder 32 and one latching clip 34 will be detailed. Each movable holder 32 is substantially L-shaped, and includes a holding piece 322 and a connecting piece 324 substantially perpendicularly connected to the holding piece 322. Two edges on opposite sides of the connecting piece 324 are bent to form two slide rails 326 correspondingly. At least one protrusion 328 is formed on the connecting piece 324. In the illustrated embodiment, there are two protrusions 328, and each protrusion 328 is in the form of an annular collar.

The latching clip 34 is substantially L-shaped, and includes a hooking piece 342 and a handle 344 substantially perpendicular to the hooking piece 342. The hooking piece 342 defines at least one hole 346 configured for engagingly receiving the at least one protrusion 328 of the movable holder 32, thus fixing the movable holder 32 to the latching clip 34. In the illustrated embodiment, there are two holes 346. The hooking piece 342 includes a protruding hook 348, which can be formed by punching. The protruding hook 348 and the handle 344 extend in substantially opposite directions from the hooking piece 342. The latching clip 34 is elastic. The width of the latching clip 34 corresponds to the distance between the free ends of the slide rails 326 of the movable holder 32.

The frame 36 is elongate, and includes a flat sheet 360 defining a plurality of openings 362. Preferably, the number of the openings 362 corresponds to the number of latching clips 34. The openings 362 are arranged in a horizontal line. A pair of guiding rails 364 are formed at opposite sides of each of the openings 362. The guiding rails 364 extend substantially perpendicularly to the horizontal alignment of the openings 362. Each pair of guiding rails 364 defines a slideway 366 for receiving the slide rails 326 of the movable holder 32 correspondingly, thus allowing the movable holder 32 to slide relative to the frame 36 along the slideway 366. The flat sheet 360 further defines a plurality of hooking slots 368 adjacent to each of the plurality of openings 362 correspondingly, thereby forming a plurality of latching edges 369. The latching edges 369 are configured for being latchingly abutting the protruding hooks 348 of the latching clips 34. The frame 36 is fixed to the enclosure 24. The width of each opening 362 corresponds to the outer width of the connecting piece 324 of the movable holder 32.

Figure 3:
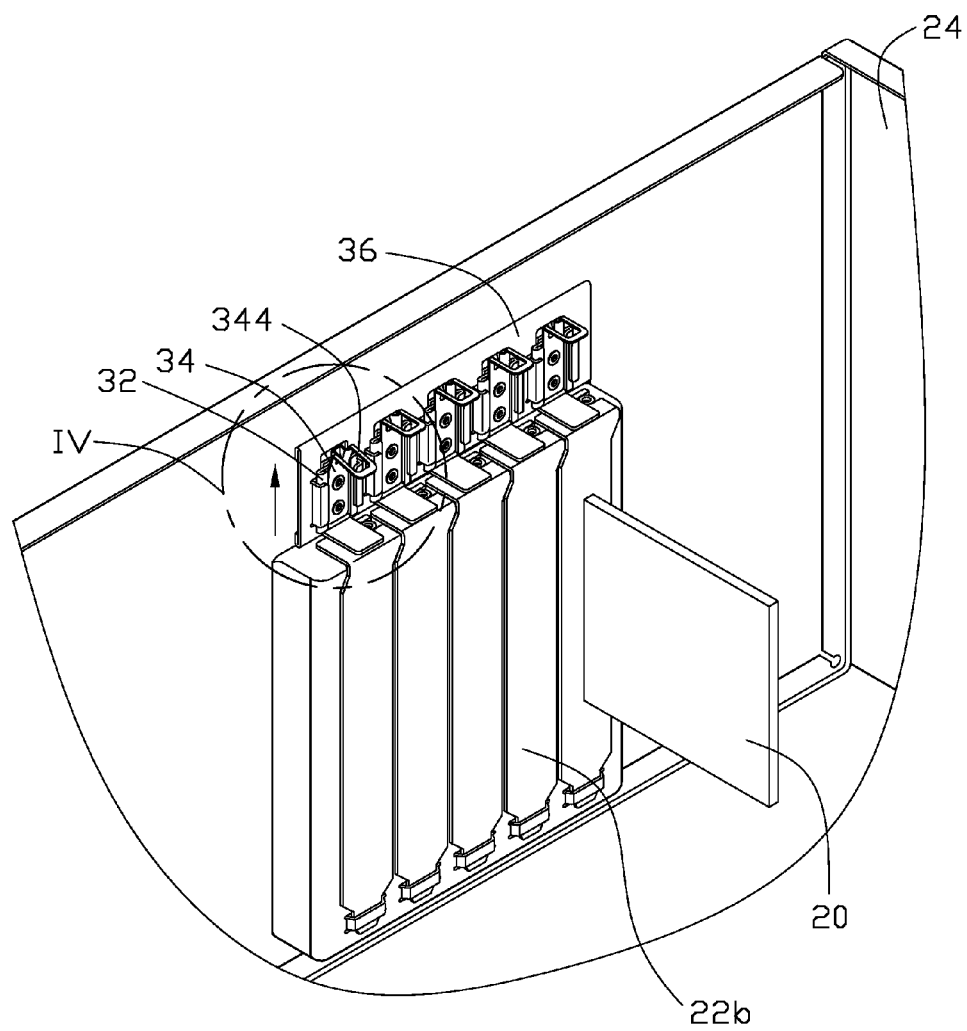
FIG. 3 is very similar to FIG. 1, but showing a process of removing one of the covers of the retention assembly.

Referring also to FIG. 3, in assembly, each movable holder 32 and one corresponding latching clip 34 are fixed to each other by inserting the protrusions 328 of the movable holder 32 into the holes 346 of the latching clip 34 and then riveting the protrusions 328 form a latching holder 31. Alternatively, the movable holder 32 and the latching clip 34 may be fixed by other fastening means such as welding and screwing. The frame 36 is fixed to the enclosure 24 and is positioned corresponding to the platform 244, with the openings 362 corresponding to the expansion card slots 242. The latching holder 31 is configured to engage in the slideway 366 along the corresponding guiding rails 364 of the frame 36. When the holding piece 322 of the movable holder 32 resists the cover 22b or the mounting portion 22a of the expansion card 20, the protruding hook 348 of the latching clip 34 is hooked into the corresponding hooking slot 368 and abuts or resists the corresponding latching edge 369.

In use, the retention assembly 30 can be considered to have two states, an open state and a closed off state. Referring to FIG. 1 again, in the closed off state, the covers 22b and the expansion cards 20 are installed in the enclosure 24. For exemplary purposes, one expansion card 20 installed in the enclosure 24 is detailed. The tab 228 of the mounting portion 22a of the expansion card 20 is inserted into the corresponding hooking member 248, and the notch 226 of the mounting portion 22a of the expansion card 20 engagingly receives the corresponding positioning member 246. In the closed off state, the holding piece 322 of the corresponding movable holder 32 abuts or resists the mounting portion 22a of the expansion card 20. The slide rails 326 of the movable holder 32 slidingly engage with the corresponding guiding rails 364 of the frame 36, and the protruding hook 348 of the corresponding latching clip 34 hooks (latches) in the corresponding hooking slot 368 and abut or resists the latching edge 369 of the frame 36.

Figure 4:
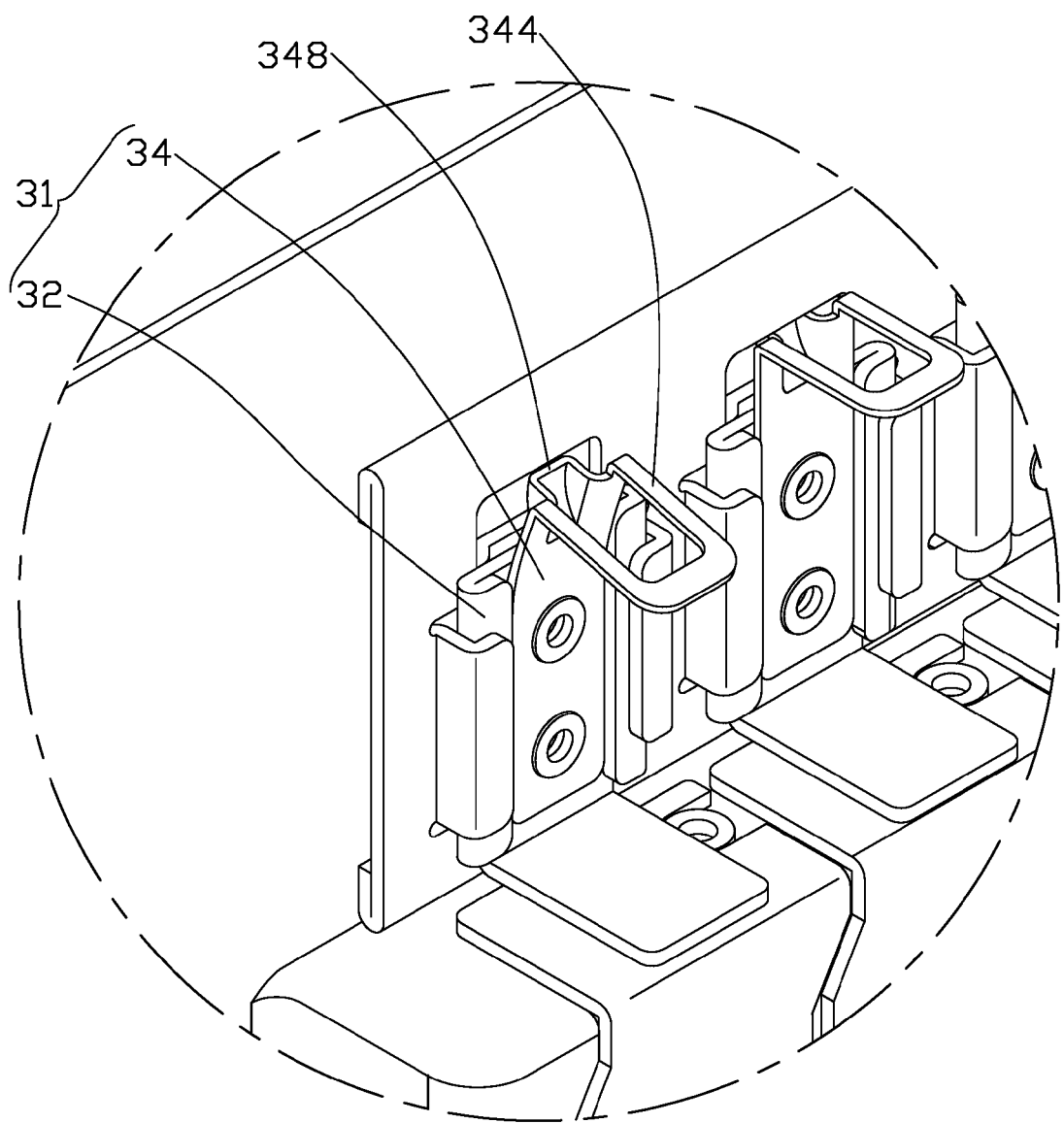
FIG. 4 is an partially enlarged view of the retention assembly taken of part IV of FIG. 3.
Figure 5:
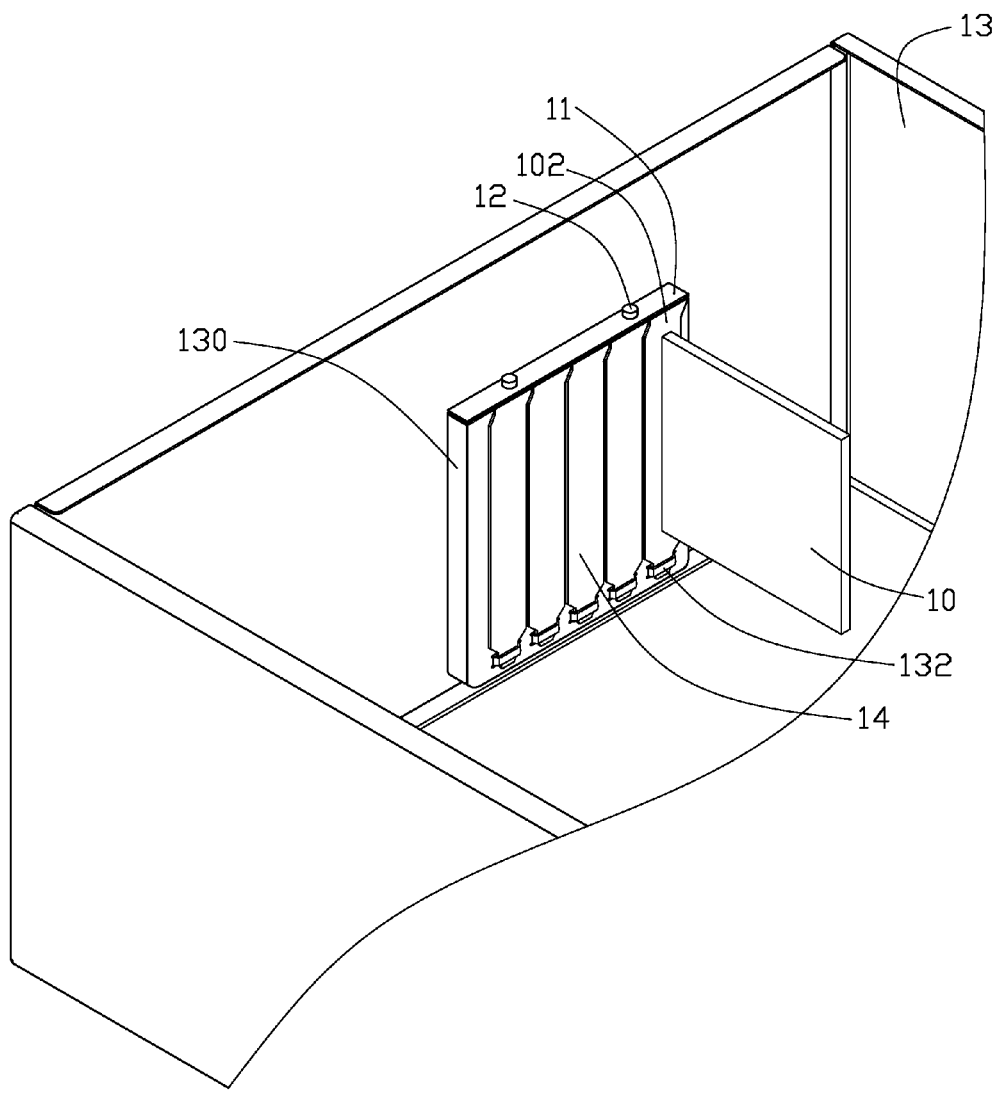
FIG. 5 is an assembled, isometric view of a part of an electronic device enclosure, the enclosure having a conventional expansion card retention assembly.

Referring to FIG. 3 and FIG. 4, to add an expansion card 20 to the enclosure 24, one corresponding cover 22b is removed. The handle 344 of the latching clip 34 is pulled horizontally away from the flat sheet 360. Thereby, the latching clip 34 deforms, and the protruding hook 348 disengages from the hooking slot 368 of the frame 36. Then the latching holder 31 can be pulled up, with the movable holder 32 sliding along the guiding rails 364 relative to the frame 36 in a direction parallel to the arrow shown in FIG. 3 until the latching holder 31 is completely disengaged from the frame 36. Then the cover 22b can be pulled up, with a tab 228 disengaging from the corresponding hooking member 248 and a fastening portion disengaged from the corresponding positioning member 246 of the platform 244.

Subsequently, an expansion card 20 can be installed in the enclosure 24 corresponding to the expansion card slot 242 which the cover 22b removed from. The steps to install the expansion card 20 are substantially the reverse of the above-described removal steps. That is, the latching holder 31 is slid down so that the movable holder 32 slides along the guiding rails 364 of the frame 36. In this process, the latching clip 34 deforms until eventually the protruding hook 348 of the latching clip 34 snappingly engages in the hooking slot 368 and abuts or resists the latching edge 369 of the frame 36. As such, the expansion card slot 242 returns to the closed off state.

In the retention assembly 30, each movable holder 32 and one corresponding latching clip 34 hold one cover 22b or one expansion card 20. Therefore when adding or removing an expansion card 20, only the corresponding latching holder 31 needs to be unlatched or latched, and any other expansion cards 20 already held in the enclosure 24 remain undisturbed firmly in position.

In an alternative embodiment, the frame 36 may be an integral part of the enclosure 24. The openings 362 of the frame 36 may be omitted, so long as the frame 36 has the guiding rails 364. Each latching holder 31 may hold more than one cover 22b and/or expansion card 20, by increasing the width of the movable holder 32. The hooking slots 368 of the frame 36 may be omitted so long as the frame 36 forms a plurality of abutting or resisting portions that function much like the latching edges 369. The protruding hook 348 of the latching clip 34 may be replaced by another suitable kind of abutting or resisting portion such as an edge of a slot.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A retention assembly for expansion cards, comprising:
a frame including at least one guiding rail and at least one resisting portion, each of the at least one resisting portion of the frame being arranged correspondingly to one of the at least one guiding rail respectively; and
at least one latching holder including a holding piece and a resisting portion to engage with one of the at least one resisting portion of the frame, and a portion of each of the at least one latching holder comprising a deformable part to enable the resisting portion of each of the latching holder and the frame to disengage from each other;
wherein each of the at least one latching holder comprises a movable holder and a latching clip, the latching clip forms the deformable part, the resisting portion, and a hooking piece; the movable holder forms the holding piece and a connecting piece; the deformable part of the latching clip is a handle substantially perpendicular to the hooking piece; the resisting portion of the latching clip is a protruding hook formed on the hooking piece, and the protruding hook and the handle extend towards opposite sides of the hooking piece.

2. The retention assembly as claimed in claim 1, wherein each of the at least one latching holder is to hold one cover or one expansion card.

3. The retention assembly as claimed in claim 1, wherein two edges of the connecting piece form two slide rails for engaging with the at least one guiding rail of the frame, thus allowing the latching holder to slide relative to the frame.

4. The retention assembly as claimed in claim 3, wherein two guiding rails of the frame are formed corresponding to each of the at least one latching holder.

5. The retention assembly as claimed in claim 3, wherein at least one protrusion is formed on the connecting piece, and the latching clip further forms a hooking piece, the hooking piece of the latching clip defines at least one hole to engage with the at least one protrusion, thus fixing the movable holder to the latching clip.

6. The retention assembly as claimed in claim 3, wherein the frame is a sheet including a flat sheet defining at least one opening, two guiding rails are formed at each of two opposite sides of each of the at least one opening, each guiding rail defines a slideway for receiving one corresponding slide rail, and the fiat sheet further defines at least one hooking slot above each of the at least one opening.

7. The retention assembly as claimed in claim 6, wherein the retention assembly comprises a plurality of latching holders, the frame defines a plurality pairs of guiding rails, a plurality of resisting portions, and a plurality of openings, the openings are aligned in a line and each opening is spaced from adjacent openings.

8. The retention assembly as claimed in claim 1, wherein the retention assembly is to install one or more cover or expansion card to an enclosure, the frame is fixed to the enclosure, each cover or expansion card defines a notch and forms a tab, the enclosure forms at least one positioning member to be received in the notch and at least one hooking member configured to be insertable by the tab.

9. The retention assembly as claimed in claim 8, wherein each expansion card comprises a mounting portion and a card portion, the mounting portion comprises an elongated main portion, a fastening portion formed at an end of the main portion, and the tab formed at an opposite end of the main portion, the fastening portion defines the notch at an edge.

10. The retention assembly as claimed in claim 9, wherein the enclosure comprises an expansion card platform extended perpendicularly inwards, the platform has a seating surface, and peripheral walls extending from the seating surface, one peripheral wall defines a first surface, an opposite peripheral wall defines a second surface, the seating surface defines at least one expansion card slot, the at least one positioning member is formed on the first surface, the at least one hooking member is formed on the seating surface adjacent to the second surface, corresponding to a bottom of one of the at least one expansion card slot.

11. The retention assembly as claimed in claim 10, wherein the platform of the enclosure is substantially rectangular, and has four surfaces including the first surface and the second surface.

12. A retention assembly for expansion cards, comprising:
at least one latching holder comprising one holding piece and one resisting portion, and at least a portion of each of the at least one latching holder comprising a deformable part; and
at least one resisting portion fixed relative to an enclosure which expansion cards are to be fastened to; a frame fixed to the enclosure;
wherein when each of the at least one latching holder fastens at least one cover or at least one expansion card to the enclosure, the holding piece of the latching holder resists and holds at least one cover or at least one expansion card to the enclosure, and the resisting portion of the latching holder resists one corresponding resisting portion of the at least one resisting portion fixed to the enclosure; when the at least one cover or the at least one expansion card is added or removed from the enclosure, the latching holder is pulled to deform to make the resisting portion of the latching holder disengaging from the corresponding resisting portion fixed relative to the enclosure, thus adding or releasing at least one cover or expansion card; each of the at least one latching holder comprises a movable holder and a latching clip, the latching clip forms the deformable part and the resisting portion, and the movable holder forms the holding niece and a connecting piece; the resisting portion fixed relative to the enclosure is formed on the frame; two edges of the connecting piece form two slide rails for engaging with at least one guiding rail of the frame, thus allowing the latching holder sliding relative to the frame; the deformable part of the latching clip is a handle substantially perpendicular to the hooking piece; the resisting portion of the latching clip is a protruding hook formed on the hooking piece, and the protruding hook and the handle extend towards opposite sides of the hooking piece.

13. The retention assembly as claimed in claim 12, wherein each of the at least one latching holder is to cooperatively hold one cover or one expansion card.

14. The retention assembly as claimed in claim 12, wherein each cover or expansion card defines a notch and forms a tab, the enclosure forms at least one positioning member configured to be received in the notch and at least one hooking member configured to be insertable by the tab.

15. The retention assembly as claimed in claim 14, wherein each expansion card comprises a mounting portion and a card portion, the mounting portion comprises an elongated main portion, a fastening portion formed at an end of the main portion, and the tab formed at an opposite end of the main portion, the fastening portion defines the notch at an edge.

16. The retention assembly as claimed in claim 15, wherein the enclosure comprises an expansion card platform extended perpendicularly inwards, the platform has a seating surface, and peripheral walls extending from the seating surface, one peripheral wall defines a first surface, an opposite peripheral wall defines a second surface, the seating surface defines at least one expansion card slot, the at least one positioning member is formed on the first surface, the at least one hooking member is formed on the seating surface adjacent to the second surface, corresponding to a bottom of one of the at least one expansion card slot.

* * * * *